3,527,838
ETHYLENE OLIGOMERIZATION
Kenneth W. Barnett, San Leandro, and Peter W. Glockner, Alameda, Calif., assignors to Shell Oil Company, New York, N.Y., a corporation of Delaware
No Drawing. Filed Jan. 13, 1969, Ser. No. 790,840
Int. Cl. C07c 3/10
U.S. Cl. 260—683.15                                6 Claims

ABSTRACT OF THE DISCLOSURE

An improved ethylene oligomerization process employs a catalyst composition produced by contacting ($\pi$-cyclopentenyl)cyclopentadienylnickel and a sulfided inorganic oxide catalyst support.

BACKGROUND OF THE INVENTION

A variety of oligomerization catalysts, both homogeneous and heterogeneous, have been utilized to convert, i.e., oligomerize, ethylene into olefinic products of higher molecular weight, e.g., to dimer, trimer, tetramer or the like. However, the character and relative proportions of the product mixture components are greatly dependent upon the particular catalyst employed. One homogeneous process is that of Tsutsui et al., J. Polymer Sci., A–1, 5, 681 (1967), which employs nickelocene, i.e., bis(cyclopentadienyl)nickel, as the catalyst species.

A related process of McClure and Barnett, U.S. Ser. No. 690,763, filed Dec. 15, 1967, now U.S. 3,424,816 employs a partially hydrogenated nickelocene, ($\pi$-cyclopentenyl)cyclopentadienylnickel, as a homogeneous catalyst. This composition produces an ethylene oligomerization product mixture which contains relatively large proportions of desirable trimer and tetramer products in contrast to the process of Tsutsui et al. which yields essentially only olefin dimer product. It would be of advantage, however, to obtain a product mixture having an equivalent or higher proportion of desirable olefinic products in the higher molecular range, particularly higher olefinic products which are advantageously linear in character.

SUMMARY OF THE INVENTION

It has now been found that an improved process of oligomerizing ethylene is obtained through the use of a heterogeneous catalyst composition produced by contacting ($\pi$-cyclopentenyl)cyclopentadienylnickel and a sulfided, solid, inorganic oxide support. The process is characterized by an ethylene conversion at moderate temperature to a product mixture of relatively high proportions of olefinic products in the higher molecular range, e.g., trimer, tetramer and higher oligomers, which are highly linear in character and predominantly alpha-olefins.

DESCRIPTION OF PREFERRED EMBODIMENT

The process of the invention contemplates, broadly speaking, intimately contacting ethylene in a liquid reaction environment with a catalyst composition produced by contacting ($\pi$ - cyclopentenyl)cyclopentadienylnickel and a sulfided inorganic oxide catalyst support in nongaseous phase. The nickel-containing catalyst composition precursor is a known compound, being disclosed by Wollensak, U.S. 3,088,960, issued May 7, 1963.

The catalyst support comprises a normally solid inorganic oxide support which has been sulfided with sulfur or a sulfur-containing compound as described below. Suitable inorganic oxide supports consist essentially of one or more metal oxides containing a major proportion of at least one metal oxide component selected from silica and alumina. Such materials are commonly known as refractory oxides and include synthetic materials as well as acid-treated clays or the crystalline meticular aluminosilicates known in the art as molecular sieves. Synthetic refractory oxides are preferred over naturally occurring materials or molecular sieves and exemplary synthetic refractory oxides include silica, alumina, silica-alumina, silica-magnesia, tungsten oxide-alumina, tungsten oxide-silica-alumina, boria-alumina, silica-alumina-zirconia, molybdenum oxide-silica-alumina and silica-titania-zirconia. Preferred refractory oxide supports are siliceous refractory oxides containing silica as the major component, and particularly preferred as the siliceous refractory oxide is silica-alumina.

It is essential to sulfide the inorganic oxide catalyst support with sulfur or a sulfur-containing compound in order to obtain a relatively high proportion of linear alpha olefins from ethylene. In general, any sulfur-containing compound, in addition to sulfur, can be employed as the sulfiding agent provided that the non-sulfur portion of the compound is substantially inert to the catalyst support. It is known that many compounds, such as alcohols and certain halogenated compounds, react with the hydroxyl groups present on the surface of inorganic oxide supports, as disclosed, for example, by R. G. Iler, "The Colloid Chemistry of Silica and Silicates," Cornell University Press, New York, 1955, chap. VIII. Accordingly, to avoid the problem of such interfering side-reactions with the catalyst support, it is generally desirable to employ sulfur compounds which contain only the atoms of hydrogen and carbon in addition to atoms of sulfur, e.g., hydrogen sulfide and hydrocarbyl sulfur compounds.

One class of suitable hydrocarbyl sulfur compounds are olefin episulfides such as alkene episulfides and cycloalkene episulfides of up to 10 carbon atoms. Exemplary alkene episulfides are propylene episulfide, 2-butene episulfide and 3-octene episulfide. Exemplary cycloalklene episulfides are cyclopentene episulfide, cyclohexene episulfide and cyclodecene episulfide. Another class of suitable hydrocarbyl sulfur compounds are dialkyl sulfides and dialkyl disulfides of up to 10 carbon atoms. Exemplary dialkyl sulfides are dimethyl sulfide, methyl ethyl sulfide, diethyl sulfide, ethyl butyl sulfide, dibutyl sulfide. Exemplary dialkyl disulfide are dimethyl disulfide, diethyl disulfide, propyl butyl sulfide, ethyl octyl sulfide. Other suitable hydrocarbyl sulfur compounds are alkyl alkenyl sulfides, e.g., methyl allyl sulfide, ethyl allyl sulfide and methyl 2-butene sulfide; aliphatic mercaptans, e.g., ethyl mercaptan, propyl mercaptan, and cyclohexyl mercaptan; alkyl dithiocarboxylic acids, e.g., thionothiolactic acid, thionothiolpropionic acid and thionothiobutyric acid; and aliphatic thioketones, e.g., dimethyl thione, methyl ethyl thione, methyl butyl thione, 2,4-pentandithione and cyclohexanethione.

Preferred sulfiding agents are sulfur and aliphatic sulfur compounds containing a high proportion of sulfur, particularly lower (up to 4 carbon atoms) olefin-episulfides, dialkyl sulfides and dialkyl disulfides.

The sulfiding treatment of the catalyst support can be conducted by any more or less conventional method provided the support is contacted with sufficient sulfiding agent to incorporate from about 0.01% by weight to about 5% by weight of sulfur based on support, preferably 0.1% by weight to about 3% by weight of sulfur on the same basis within the support. In one modification, the sulfided catalyst support is prepared by contacting the catalyst support with a solution of the sulfiding agent in a substantially inert liquid diluent. Illustrative of suitable diluents are hydrocarbons free from aliphatic unsaturation such as hexene, octane, decane, dodecane, cyclohexane, decahydronaphthalene, benzene, toluene and xylene. The catalyst support, sulfiding agent and diluent are contacted at any convenient temperature with the range from about 20° C. to about 150° C. being satisfactory. The pressure to be employed is not critical provided that the pressure is sufficient to maintain the reaction mixture substantially in a non-gaseous phase. Pressures from about 1 atmosphere to about 50 atmospheres are satisfactory.

No special pretreatment of the catalyst support prior to contact with the sulfiding agent is required, but better results are obtained if the support has been calcined at temperatures from about 450° C. to about 600° C. for a period of from about 6 to about 24 hours prior to contact with the sulfiding agent.

Subsequent to the contacting of the catalyst support and the sulfiding agent, the resulting sulfided catalyst support is separated from the diluent phase by conventional techniques, such as filtration and decantation.

The catalyst composition is produced by contacting the sulfided inorganic oxide catalyst support and the ($\pi$-cyclopentenyl)cyclopentadienyl-nickel. Although other conventional contacting techniques are on occasion useful, the preferred method of contacting the catalyst support and the ($\pi$-cyclopentenyl)cyclopentadienylnickel is to intimately contact the support with a solution of the nickel compound in a liquid hydrocarbon reaction diluent. Illustrative of such diluents are hydrocarbons free from aliphatic unsaturation such as hexane, heptane, octane, decane, dodecane, cyclohexane, decahydronaphthalene, benzene, toluene and xylene. The amount of nickel compound to be employed in contacting the sulfided catalyst support is not critical so long as sufficient nickel is introduced onto the support to allow adequate ethylene/catalyst contact during the ethylene oligomerization process in which the catalyst composition is employed. Amounts of ($\pi$-cyclopentenyl)cyclopentadienylnickel to be utilized in contacting the catalyst support which are from about 0.1% by weight to about 15% by weight based on the catalyst support are satisfactory with amounts from about 0.5% by weight to about 5% by weight on the same basis being preferred.

The catalyst composition components are contacted at any convenient temperature with the range from about 50° C. to about 200° C. being satisfactory. The pressure to be employed is not critical provided the pressure is sufficient to maintain the reaction mixture substantially in a non-gaseous phase. Pressures from about 1 atmosphere to about 50 atmospheres are satisfactory.

Subsequent to the contacting of the sulfided catalyst support and the ($\pi$-cyclopentenyl)cyclopentadienylnickel, the resulting catalyst composition is separated from the diluent, if desired, by conventional techniques such as filtration and decantation. In most instances, however, it is more convenient to directly employ the mixture of diluent and catalyst composition in the ethylene oligomerization process wherein the presence of a reaction diluent is also desired.

The ethylene oligomerization process is conducted by contacting, in non-gaseous phase, the ethylene, the catalyst composition and a reaction diluent which is the same as or is similar to the diluent utilized in the production of the catalyst composition. In certain modifications of the process, a portion of the oligomer product suitably serves as at least a portion of the reaction diluent and less added diluent is required. In most instances, however, added diluent is used and amounts up to about 5 moles of diluent per mole of ethylene are satisfactory. The ethylene oligomerization is conducted in an inert reaction environment so that the reaction conditions are substantially anhydrous and substantially oxygen-free.

The amount of oligomerization catalyst composition employed in the process is not critical. Generally, amounts of catalyst composition from about 1% by weight to about 200% by weight based on ethylene are satisfactory with amounts from about 10% by weight to about 100% by weight on the same basis being preferred.

The precise method of establishing ethylene/catalyst contact is not critical. In one modification, the catalyst composition and the diluent are charged to an autoclave or similar pressure reactor, the ethylene feed is introduced, and the reaction mixture is maintained with agitation at reaction temperature and pressure for the desired reaction period. Another modification comprises passing, in a continuous manner, the ethylene feed in liquid-phase solution in the reaction diluent through a reaction zone in which the catalyst composition is maintained. By any modification, the oligomerization process is conducted at moderate temperatures and pressures. Suitable reaction temperatures vary from about 20° C. to about 200° C., but preferably from about 35° C. to about 100° C. The reaction is conducted at or above atmospheric pressure. The precise pressure is not critical, so long as the reaction mixture is maintained substantially in a non-gaseous phase. Typical pressures vary from about 1 atmosphere to about 80 atmospheres with the range from about 2 atmospheres to about 35 atmospheres being preferred.

At the conclusion of reaction, the oligomeric products are separated by conventional methods such as fractional distillation, selective extraction, adsorption and the like. The reaction diluent and any unreacted ethylene are recycled for further utilization.

The ethylene oligomer products are materials of established utility and many are chemicals of commerce. The oligomer products, which remain ethylenic in character, are converted by conventional "Oxo" processes to aldehydes which are hydrogenated with conventional catalysts to the corersponding alcohols. Alternatively, the product olefins are converted to secondary and tertiary alcohols as by sulfuric acid-catalyzed hydration. The $C_{12}$-$C_{20}$ alcohols thereby produced are ethoxylated as by reaction with ethylene oxide in the presence of a basic catalyst, e.g., sodium hydroxide, to form conventional detergents and the lower molecular weight alcohols are esterified by reaction with polybasic acids, e.g., phthalic acid, to form plasticizers for polyvinyl chloride. The linear $C_{14}$-$C_{18}$ alpha-olefin products of the process of the invention are particularly advantageously employed for conversion, e.g., as by treatment with sulfur trioxide, to alpha olefin sulfonates, which are useful as biodegradable detergents.

To further illustrate the improved process of the invention and the novel catalyst composition therefor, the following examples are provided. It should be understood that the details thereof are not to be regarded as limitations as they may be varied as will be understood by one skilled in this art.

EXAMPLE I (A) A sulfided silica-alumina support was prepared by contacting a 100 g. sample of silica-alumina (25% alumina, specific surface area of about 500 m.$^2$/g.) and 0.5 ml. of cyclohexene episulfide in 20 ml. of n-heptane at a temperature of about 25° C. for about 18 hours. The resulting sulfided silica-alumina support was filtered, washed with isopentane and dried under vacuum at a temperature of about 25° C. Elemental analysis showed that the silica-alumina support was sulfided with 1.0% by weight of sulfur based on silica-alumina.

A catalyst composition was prepared by charging to an autoclave 2.0 g. of the sulfided silica-alumina prepared above, 0.1 g. of (π-cyclopentenyl)cyclopentadienylnickel and 20 ml. of n-heptane. The mixture was heated for one hour at a temperature of 100° C. The autoclave was cooled and the resulting catalyst composition was employed for ethylene oligomerization by charging at room temperature 200–300 p.s.i.g. of ethylene whereupon an exothermic reaction took place. Several repressurings gave the same results. The product mixture was removed and analyzed by gas-liquid chromatographic techniques. The results of this run are reported in Table I under Run I.

(B) The same procedure was employed to produce a catalyst composition by contacting (π-cyclopentenyl)cyclopentadienylnickel with silica-alumina support which had not been sulfided. This catalyst composition was also contacted with ethylene in n-heptane by the same procedure employed in Example IA to afford the results reported in Table I as Run B.

TABLE I

| Run | A | B |
|---|---|---|
| Conditions: | | |
| Temperature, °C | 50–60 | 50–75 |
| Time, hr | 1 | 1 |
| Pressure, p.s.i.g | 200–300 | 400 |
| Total ethylene converted, g | 2.3 | 11.6 |
| Selectivity, percent wt.: | | |
| $C_4$ | 47 | 58 |
| $C_6$ | 27 | 25 |
| $C_8$ | 9 | 10 |
| $C_{10}$ | 7 | 4 |
| $C_{12}$–$C_{22}$ | 10 | 2 |
| Linearity of olefin product, percent: | | |
| $C_4$ | 100 | 100 |
| $C_6$ | 95 | 81 |
| $C_8$ | 86 | 63 |
| $C_{10}$ | 86 | 48 |
| $C_{12}$–$C_{22}$ | 82 | |
| $C_4$ composition, percent: | | |
| 1-butene | 95 | 38 |
| 2-butene | 5 | 62 |

EXAMPLE II (A) A 100 g. sample of commercial silica-alumina cracking catalyst was stirred with 0.05 ml. of dimethyl disulfide ($CH_3SSCH_3$) in 20 ml. of n-heptane at a temperature of about 25° C. for about 18 hours. The resulting sulfided silica-alumina was filtered, washed with n-pentane and dried under vacuum at a temperature of 25° C. Elemental analysis showed that 0.34% by weight of sulfur, based on the silica-alumina, was incorporated into the silica-alumina.

(B) By a similar procedure, dimethyl disulfide was used to prepare a sulfided silica-alumina containing 0.13% by weight of sulfur.

(C) By a procedure identical to that employed in Example IIA, a 0.04 ml. sample of methylallyl sulfide ($CH_3S$–$C_3H_5$) was used to sulfide a 10 g. sample of silica-alumina support. The resulting sulfided silica-alumina support contained 0.13% by weight of sulfur.

(D) By a procedure identical to that employed in Example IIA, a solution of 0.1 g. of elemental sulfur ($S_8$) in 40 ml. of toluene was used to sulfide a 10.0 g. sample of silica-alumina support. The resulting sulfided silica-alumina support contained 1.0% by weight of sulfur.

EXAMPLE III

Catalyst compositions were prepared from the sulfided silica-alumina supports prepared in Example II by contacting 2.0 g. of each sulfided support with 0.1 g. of (π-cyclopentenyl)cyclopentadienylnickel in n-heptane by a procedure similar to Example IB. Each catalyst composition was then employed for the oligomerization of ethylene. The results are provided in Table II.

TABLE II

| Run | A | B | C | D |
|---|---|---|---|---|
| Sulfiding agent | $CH_3SSCH_3$ | $CH_3SSCH_3$ | $CHS_3C_3H_5$ | $S_8$ |
| Percent wt. S on support | 0.34 | 0.14 | 0.13 | 1.0 |
| Conditions: | | | | |
| Temperature, °C | 45–50 | 35–40 | 50 | 50 |
| Time, hr | 3 | 2 | 1 | 2 |
| Pressure, p.s.i.g | 400 | 450 | 450 | 40 |
| Ethylene converted, g | 1.4 | 5.5 | 1.2 | 0.5 |
| Selectivity, percent: | | | | |
| $C_4$ | 60 | 63 | 73 | 71 |
| $C_6$ | 18 | 17 | 12 | 15 |
| $C_8$ | 8 | 9 | 10 | 8 |
| $C_{10}$ | 6 | 4 | 4 | 7 |
| $C_{12}$ | 8 | 7 | | |
| Linearity of olefin product, percent: | | | | |
| $C_6$ | 88 | 90 | 90 | 91 |
| $C_8$ | 88 | 79 | 90 | 81 |
| $C_{10}$ | 88 | 78 | 90 | 72 |
| $C_{12}$ | 88 | 81 | | |
| $C_4$ composition, percent: | | | | |
| 1-butene | 92 | 74 | .95 | 82 |
| 2-butenes (cis and trans) | 8 | 26 | 5 | 12 |

We claim as our invention:

1. The process of oligomerizing ethylene by contacting ethylene, in the liquid phase at a temperature of from about 20° C. to about 200° C. with a catalyst composition produced by contacting (1) a sulfided inorganic oxide catalyst support containing from about 0.1% by weight to about 5% by weight of sulfur and (2) from about 0.1% by weight to about 15% by weight based on catalyst support of (π-cyclopentenyl)cyclopentadienylnickel, in an inert liquid reaction diluent.

2. The process of claim 1 wherein the catalyst support is a siliceous refractory oxide.

3. The process of claim 2 wherein the sulfur is incorporated on the catalyst support in amounts from about 0.1% by weight to about 3% by weight based on support by contacting the catalyst support with elemental sulfur or a sulfur compound containing only the atoms of carbon, hydrogen and sulfur.

4. The process of claim 3 wherein the sulfur compound is selected from olefin episulfides, dialkyl disulfides and dialkyl sulfides of up to 10 carbon atoms.

5. The process of claim 4 wherein the sulfur compound is cyclohexene episulfide.

6. The process of claim 4 wherein the catalyst support is silica-alumina.

References Cited

UNITED STATES PATENTS 3,163,682   12/1964   Walker et al. _____ 260—683.9
3,424,816    1/1969   McClure et al. ___ 260—683.15
3,459,826    8/1969   Barnett et al. _____ 260—683.15

PAUL M. COUGHLAN, Jr., Primary Examiner

U.S. Cl. X.R.

252—430